(12) United States Patent
White et al.

(10) Patent No.: US 11,364,754 B2
(45) Date of Patent: Jun. 21, 2022

(54) TRAILER HITCH SECURITY SYSTEM

(71) Applicants: Stephen M White, San Antonio, TX (US); Chase A White, San Antonio, TX (US)

(72) Inventors: Stephen M White, San Antonio, TX (US); Chase A White, San Antonio, TX (US)

( * ) Notice: Subject to any disclaimer, the term of this patent is extended or adjusted under 35 U.S.C. 154(b) by 275 days.

(21) Appl. No.: 16/822,680

(22) Filed: Mar. 18, 2020

(65) Prior Publication Data

US 2021/0291600 A1 Sep. 23, 2021

(51) Int. Cl.
*B60D 1/28* (2006.01)
*B60D 1/167* (2006.01)
*B60D 1/02* (2006.01)

(52) U.S. Cl.
CPC ............. *B60D 1/28* (2013.01); *B60D 1/025* (2013.01); *B60D 1/167* (2013.01)

(58) Field of Classification Search
CPC . B60D 1/00; B60D 1/28; B60D 1/025; B60D 1/167
See application file for complete search history.

(56) References Cited

U.S. PATENT DOCUMENTS

| | | | | |
|---|---|---|---|---|
| 3,738,684 A * | 6/1973 | Lusk | ...................... | B60F 3/0092 280/491.4 |
| 3,905,619 A * | 9/1975 | Sylvester | ............... | B60D 1/167 280/416.2 |
| 4,202,562 A * | 5/1980 | Sorenson | ............... | B60D 1/247 280/415.1 |
| 4,269,429 A * | 5/1981 | Eichstadt | ............... | B64F 1/224 244/50 |
| 5,423,566 A * | 6/1995 | Warrington | ............... | B60R 9/06 224/532 |
| 7,004,491 B1 * | 2/2006 | Allsop | ...................... | B60D 1/52 280/491.2 |
| 7,007,967 B2 * | 3/2006 | Goettker | ............... | B60D 1/155 280/479.2 |
| 8,308,185 B2 * | 11/2012 | Weaver | .................. | B60D 1/025 280/506 |
| 8,419,041 B2 * | 4/2013 | Bessette | .................... | B60D 1/52 280/506 |
| 8,910,964 B2 * | 12/2014 | Bogoslofski | ............... | B60R 9/06 280/515 |
| 2011/0089669 A1 * | 4/2011 | Despres | ................... | B60D 1/52 29/525.01 |
| 2013/0032621 A1 | 2/2013 | Bogoslofski et al. | | |
| 2019/0329614 A1 * | 10/2019 | Borkholder | ............ | B60D 1/248 |

FOREIGN PATENT DOCUMENTS

WO 2004039632 9/2004

* cited by examiner

*Primary Examiner* — Tony H Winner
*Assistant Examiner* — Michael R Stabley
(74) *Attorney, Agent, or Firm* — Volta Law Group

(57) ABSTRACT

The present invention relates to a device and method for securing a non motorized trailer from unauthorized movement by attaching a keyed tongue bar to an authorized vehicle and attaching a paired tongue receiver to the non motorized trailer. If a vehicle does not have attached thereto the keyed tongue, the vehicle, i.e. unauthorized vehicle, will not be able to be attached to and move the trailer. The keyed tongue bar and paired tongue receiver have an abstract-shaped end and matched abstract-shaped opening, respectively.

5 Claims, 4 Drawing Sheets

TRAILER HITCH SECURITY SYSTEM

The present invention relates generally to systems for coupling trailers to towing vehicles. In a more specific, the invention relates to a device for preventing theft of trailer by unauthorized users after trailers are decoupled from authorized towing vehicles.

BACKGROUND ART

Many different configurations of hitching systems are known in the art for allowing a trailer to be readily coupled to and decoupled from a towing vehicle. For example, a trailer can be attached to a vehicle through the use of a hitch ball attached to the rear of the towing vehicle and a socket hitch attached to the yoke of the trailer. To tow the trailer, the socket hitch receives the hitch ball and thus couples the trailer to the vehicle. When the trailer is decoupled from the vehicle, the socket hitch can be the recoupled to another vehicle. U.S. Pat. Publication No. 2013/0032621 teaches a towing assembly including a tongue (which attaches to a towing vehicle) and a receiving portion, wherein the tongue is inserted into the receiving portion.

The problem with the above example prior art system, Publication 2013/0032621 is when a trailer is decoupled from a vehicle, it can be easily attached to another unauthorized vehicle and hauled by that unauthorized vehicle. Thus, nonowners of the trailer can attach their vehicle to the trailer as long as the nonowners vehicle has a standard hitch ball attached to it. As a lock is specified for a particular key, the present invention solves a long felt need by requiring trailer hitch to be specified for a particular corresponding socket. PCT Application WO 2004/039632 teaches a method for securing a trailer after being unattached from a vehicle. However, in the event a second, unauthorized vehicle, possesses the tongue alike the tongue of the authorized vehicle, the trailer may be towed away by the unauthorized vehicle.

BRIEF DESCRIPTION OF THE INVENTION

The present invention has as its goal to provide a device and method for securing an unattached trailer from unauthorized attachment as well as unauthorized movement. The present invention accomplishes its goal by attaching a keyed tongue to an authorized vehicle and a paired tongue receiver to a trailer. In use, the keyed tongue attached to the authorized trailer can only be attached to the specific paired tongue receiver whereby the trailer may then be moved. By requiring the use of a paired tongue and matching tongue receiver, a trailer cannot be attached to an unauthorized vehicle and may not be used without authorization of the owner of the paired tongue.

It will be readily understood that the components of the embodiments as generally described and illustrated in the FIGs herein, may be arranged and designed in a wide variety of different configurations in addition to the described example embodiments. Thus, the following more detailed description of the example embodiments, as represented in the FIGs, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

As used here in the term "keyed tongue" shall refer to an extension whose end can be varied in shape, specifically an abstract variable shape. The "keyed tongue" is to be matched to a tongue receiver, wherein the keyed tongue is specific for insertion into the opening of the tongue receiver;

The term "tongue receiver" shall refer to a hallowed block capable of internally accepting the keyed tongue;

The term "trailer" shall refer to a non motorized vehicle capable of being pulled by a powered vehicle;

The term "powered vehicle" shall refer to a motorized vehicle, such as a car, snowmobile, motorcycle, and the like;

The term "authorized" refers to a powered vehicle that has attached to it a keyed tongue specific for a paired tongue receiver attached to a trailer;

The term "unauthorized" refers to a powered vehicle that has attached to it a tongue that is not paired to a tongue receiver.

The term "embodiments" refers to all commonly known or proprietary trailer coupling systems such as Ball Hitch, Pintle, 5th wheel, and gooseneck systems.

DESCRIPTION OF THE INVENTION WITH REFERENCE TO THE DRAWINGS

Figure 1:
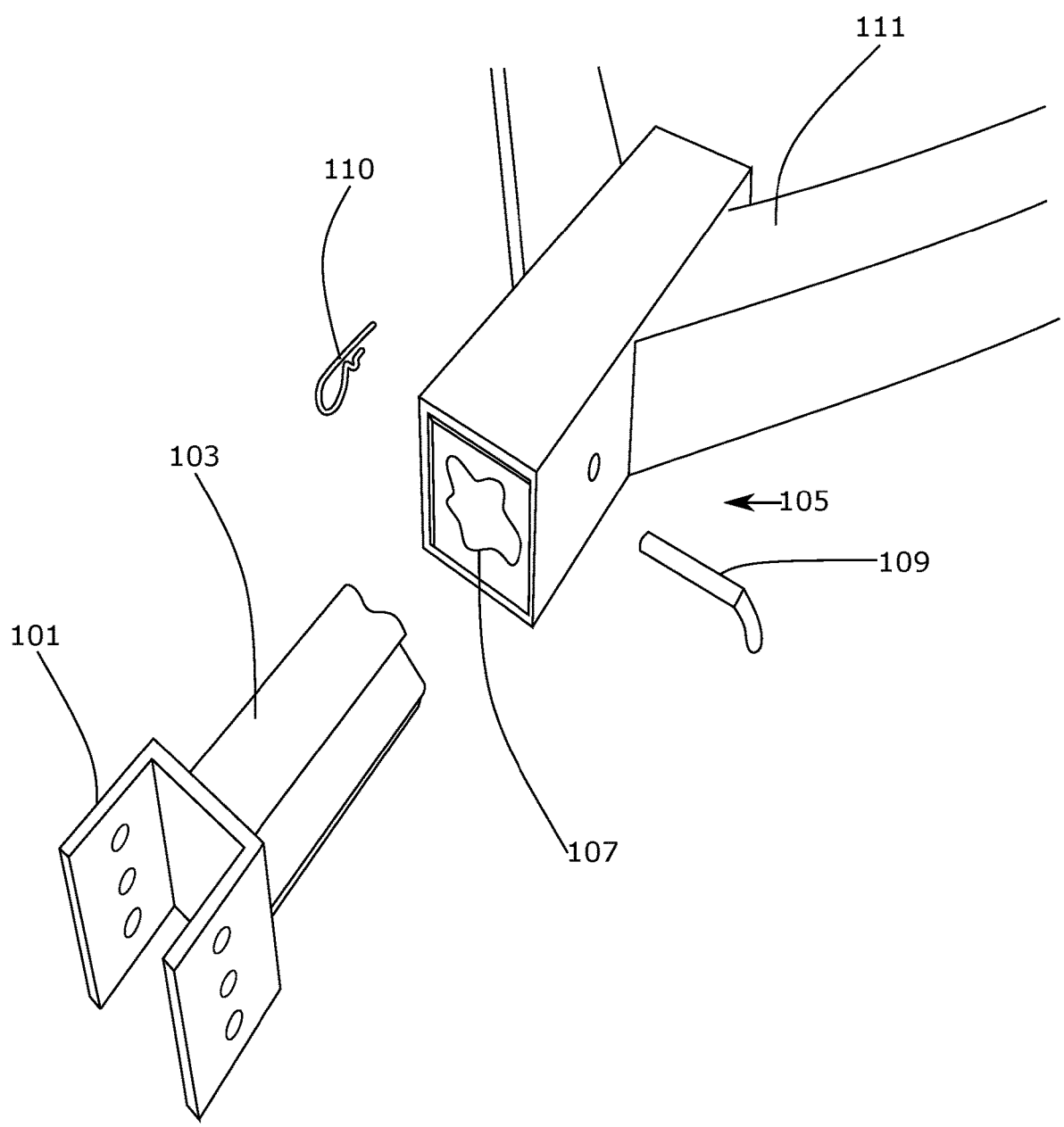
FIG. 1 of the present invention shows the keyed tongue and paired tongue receiver.

With reference to the FIGs, FIG. 1 is an embodiment of the present invention wherein a device includes a keyed tongue 103 having an abstract-shaped end on one part and an attachment means 101 on its opposite end. The attachment means 101 is used for attaching to a powered vehicle (not shown).

The keyed tongue 103 can be made of material, preferably metal. The attachment means 101 can be a variety of attachment mechanisms, in a preferred embodiment the attachment means 101 attaches by physical means, such as screws or bolts. The physical means of attachment can be one or more points of attachment, for example one or more screws. The abstract-shaped end of the keyed tongue 103 can be formulated as a key, for example a door key, meaning it possesses an ill-determined shape specified only by the whims of the cutting device. In the event the keyed tongue 103 is made of metal, the cutting device forming the abstract-shaped end of the keyed tongue 103 can be do by high speed steel tools or carbide tools. The device as shown in FIG. 1 further includes, a tongue receiver portion 105 whereby the tongue receiver portion 105 is attached to a trailer (not shown). The tongue receiver portion 105 has a hallowed opening whereby the opening 107 can accept the keyed tongue 103. Upon insertion of the keyed tongue 103 into the opening 107, the keyed tongue 103 is locked in place using a hitch pin 109, wherein lock is achieved through the use of a clip 110. The tongue receiver portion 105 further includes at least one arm 111 to provide sufficient support and attachment to the trailer (not shown).

Any party, which can be the driver of a vehicle, whereby the vehicle has thereon a keyed tongue can be considered an authorized user for towing away a matched trailer. In this case it is the trailer that has modified with the integral receiver (welded on or otherwise permanently attached), and the vehicle is employing a stock hitch system.

Figure 2:
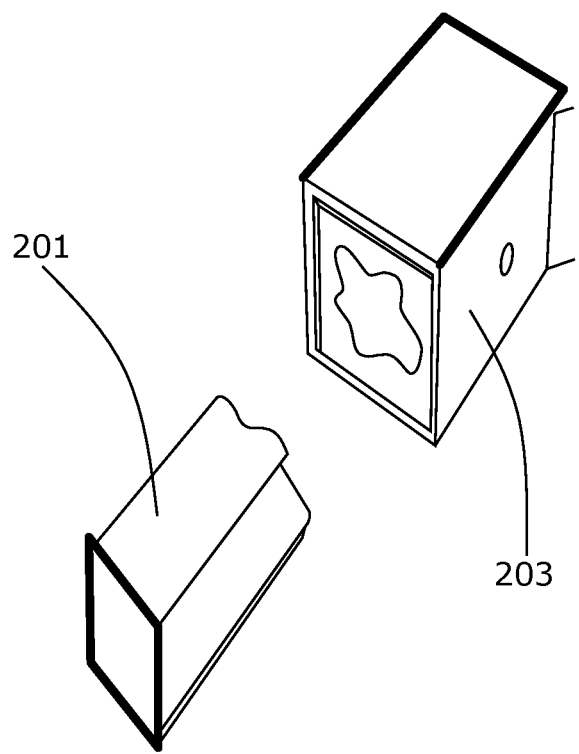
FIG. 2 is a further embodiment of the device of the present invention.

FIG. 2 is a further embodiment of the keyed tongue and the accepting tongue receiver. As shown the portion to be inserted into tongue receiver 203 of the keyed tongue 201 is abstractly shaped. The keyed tongue 201 is defined to be paired to the receiver by either standard geometries such as star or octagon shapes as well as non-uniform shape that can be altered either by random adjustments or parametric adjustments. The keyed tongue 201 may be made to a well-known process in the art such as metal cutting. The keyed tongue 201 with its abstract shape is designed to fit within the opening of the receiver 203. The opening of the tongue receiver 203 is matched to that of the keyed tongue 201. The opening of the receiver 203 can be created through well-known means in the art, for example metal cutting procedures.

The keyed tongue is attached to preferably an authorized powered vehicle while the paired tongue receiver 203 is attached to the trailer.

As a further embodiment of the present invention, the invention may be inserted between proprietary or commonly known trailer coupling systems such as hitch and ball of existing trailer systems. In other words, the present invention may serve as the intermediary, bringing additional security to trailer hitch systems.

Figure 3:
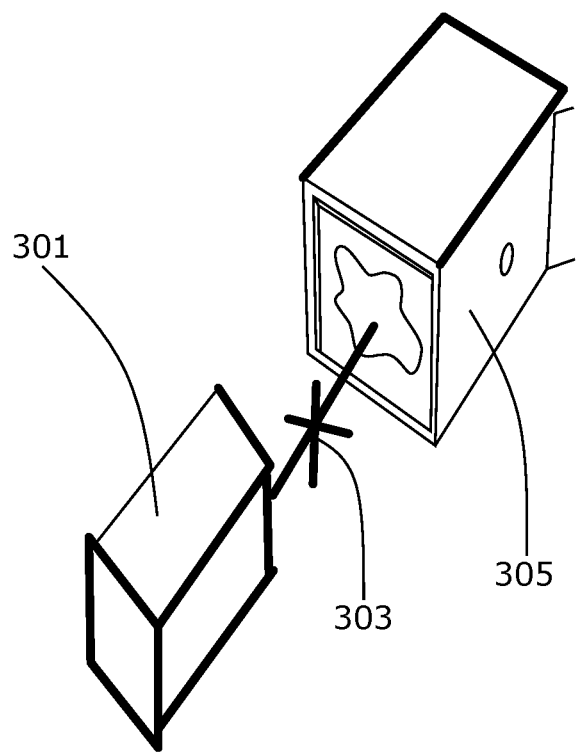
FIG. 3 shows unauthorized attempt to attach an unpaired tongue to a receiver of the present invention.

FIG. 3 is an embodiment of an unpaired tongue 301 not capable of fitting 303 into the tongue receiver 305 of a trailer. As shown, in the event a vehicle has attached a standard tongue 301, which includes a tongue that is square shaped, rectangular shaped, or just does not fit within the tongue receiver, it will not be able to fit into the opening of the tongue receiver 305. Thus, the present invention provides security means as in the event an unauthorized user has a tongue that cannot fit within the opening of the tongue receiver, the trailer will not be able to be moved by the unauthorized vehicle.

It should be further noted that the hitch pairing system may be applied to the vehicle side enabling a paired hitch to be disconnected from the motorized vehicle to authorize or deauthorize a vehicle from being able to tow the trailer.

Figure 4:
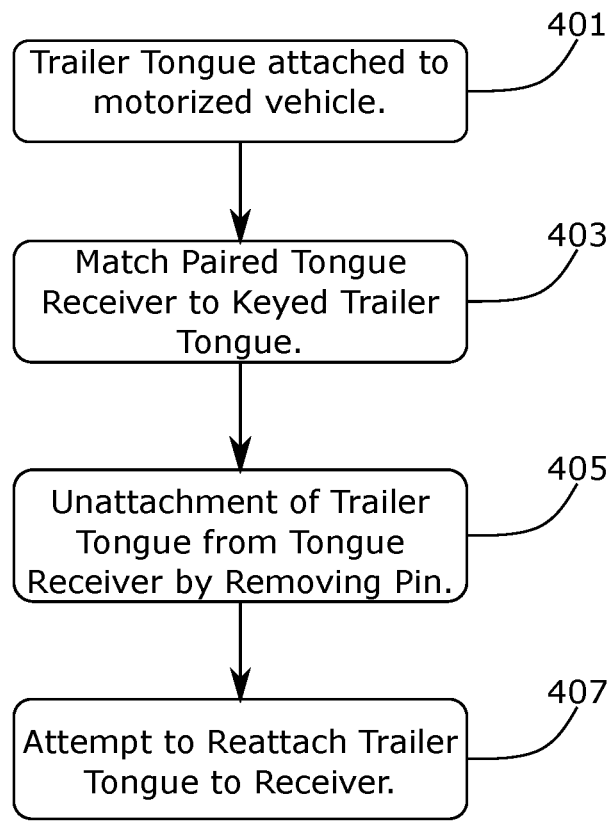
FIG. 4 is an embodiment of the method of the present invention.

FIG. 4 is a method of the present invention whereby a keyed tongue is fit within a specific paired tongue receiver in order to allow movement of trailer by an authorized vehicle. In the method of the present invention, a keyed trailer tongue is attached to a motorized vehicle 401. A paired tongue receiver is unattached to a trailer 403 wherein the paired tongue receiver is matched to the keyed trailer tongue. Match being referred to the keyed trailer tongue is able to fit inside the hollow space opening of the paired tongue receiver. Upon movement of the trailer, the vehicle may be unattached from the trailer by removing of a pin which allows the keyed trailer tongue to be removed from the hollow space opening of the paired tongue receiver 405. If it is desirable to move the trailer again by the authorized vehicle, the vehicle having the keyed trailer tongue is then moved into place 407. In the event that keyed trailer tongue can fit within the tongue receiver, the trailer can then be moved by the motorized vehicle. in the event that the trailer tongue cannot fit within the hollow space opening of the tongue receiver, the trailer cannot be moved by the motorized vehicles. In this way, the trailer is protected and secured from being moved by unauthorized vehicles and unauthorized users.

Although various embodiments of the present invention have been shown and described, modifications may occur to those skilled in the art upon reading the specification. The present invention includes such modifications and is limited only by the scope of the claims.

The invention claimed is:

1. A device for attaching a non-motorized trailer to a vehicle, comprising:
   a keyed tongue attached to a first half of the device,
   an attachment means for attaching said first half of said device to said vehicle,
   an opening on a second half of the device, wherein said opening is matched to said keyed
   a hitch pin for inserting through said second half and said keyed tongue,
   at least one arm for attachment to said trailer, whereby said at least one arm is attached to
   said second half of said device,
   wherein said keyed tongue is shaped as non-uniform shape, the non-uniform shape comprising at least one of an irregular angle, a slant, and a spherical side.

2. The device of claim 1, wherein said attachment means for attaching said first
   half of said device comprises drilled holes for accepting bolts.

3. The device of claim 1, wherein said vehicle is a motorized vehicle.

4. The device of claim 1, wherein said device includes three arms for attachment to said trailer.

5. A method for attaching a non-motorized trailer to a vehicle, comprising the steps of:
   attaching a keyed tongue to said trailer, wherein said keyed tongue is shaped as a non-uniform shape, the non-uniform shape comprising at least one of an irregular angle, a slant, and a spherical side;
   attaching a paired tongue receiver to said vehicle;
   inserting said keyed tongue into said paired tongue receiver; and
   inserting a pin through said tongue receiver and said keyed tongue.

* * * * *